US010556744B2

(12) United States Patent
Winkler

(10) Patent No.: US 10,556,744 B2
(45) Date of Patent: Feb. 11, 2020

(54) CONVEYING VEHICLE AS WELL AS BASE FRAME AND MODULAR SYSTEM FOR CONVEYING VEHICLE

(71) Applicant: SSI SCHÄFER PEEM GMBH, Graz (AT)

(72) Inventor: Max Winkler, Graz (AT)

(73) Assignee: SSI SCHÄFER PEEM GMBH, Graz (AT)

(*) Notice: Subject to any disclaimer, the term of this patent is extended or adjusted under 35 U.S.C. 154(b) by 0 days.

(21) Appl. No.: 16/028,748

(22) Filed: Jul. 6, 2018

(65) Prior Publication Data
US 2018/0312334 A1 Nov. 1, 2018

Related U.S. Application Data

(63) Continuation of application No. 15/003,192, filed on Jan. 21, 2016, now Pat. No. 10,059,516, which is a (Continued)

(30) Foreign Application Priority Data

Jul. 23, 2013 (DE) .................. 10 2013 107 873

(51) Int. Cl.
B65G 1/04 (2006.01)
B62D 29/04 (2006.01)
B66F 9/06 (2006.01)

(52) U.S. Cl.
CPC ........... *B65G 1/0492* (2013.01); *B62D 29/04* (2013.01); *B66F 9/063* (2013.01); *B62D 29/048* (2013.01);
(Continued)

(58) Field of Classification Search
CPC ...... B62D 65/00; B62D 23/00; B62D 23/046; B62D 21/00; B62D 21/09; B62D 27/00;
(Continued)

(56) References Cited

U.S. PATENT DOCUMENTS 3,112,148 A 11/1963 Wochner
3,325,591 A 6/1967 Wahl
(Continued)

FOREIGN PATENT DOCUMENTS

DE 101 48 456 A1 4/2003
DE 20 2009 016 914 U1 4/2010
(Continued)

Primary Examiner — James A Shriver, II
Assistant Examiner — Steve Clemmons
(74) Attorney, Agent, or Firm — Renner, Otto, Boisselle & Sklar, LLP

(57) ABSTRACT

A base frame (34) which is universally usable for different modular structured conveying vehicles (30), in particular for shuttles (32), wherein the conveying vehicles (30) can travel horizontally along a travelling direction (52) in a storage and order-picking system (10), wherein the base frame (34) comprises a supporting frame (36) and a structure (38) connected to the frame (36), wherein at least the structure (38) is made of plastic only, and wherein the structure (38) comprises a plurality of component-specific seatings (58) being formed integrally with the structure (38) and being configured to positively hold in a resilient clamp at least one of the following functional components (60) of the respective conveying vehicle (30): a bearing (62); a driving unit (64); a sensor (66); an actuator (68); a load-handling device (70); a communication unit (78); a cabling (76); and an electric controlling unit (80) wherein each of the functional components (60) is positively insertable in or on the respective component-specific seating (58) along a component-specific mounting direction.

18 Claims, 5 Drawing Sheets

Related U.S. Application Data continuation of application No. PCT/EP2014/065149, filed on Jul. 15, 2014.

(52) U.S. Cl.
CPC .... *Y10T 24/45524* (2015.01); *Y10T 24/45529* (2015.01)

(58) Field of Classification Search
CPC ...... B62D 27/06; B62D 29/04; B62D 29/041; B62D 29/043; B62D 29/046; B62B 5/003; B62B 5/005; B66F 9/063; B65G 1/0492

See application file for complete search history.

(56) References Cited

U.S. PATENT DOCUMENTS

| | | | |
|---|---|---|---|
| 3,550,948 A * | 12/1970 | McKinley, Jr. | B62D 29/001 296/181.2 |
| 3,622,822 A | 11/1971 | Lofstrand | |
| 3,628,284 A | 12/1971 | Soulakis | |
| 4,422,685 A | 12/1983 | Bonfilio | |
| 4,443,968 A | 4/1984 | Law | |
| 4,573,707 A * | 3/1986 | Pabst | B62D 21/00 280/792 |
| 4,628,592 A | 12/1986 | Mahon | |
| 4,695,267 A | 9/1987 | Simmel | |
| 4,896,899 A | 1/1990 | Lawrence | |
| 5,193,879 A * | 3/1993 | Chen | A63G 25/00 180/311 |
| 5,558,368 A * | 9/1996 | Cerny | B62D 29/041 280/781 |
| 5,611,105 A * | 3/1997 | Blehert | A47L 11/4066 15/320 |
| 5,819,408 A | 10/1998 | Catlin | |
| 6,095,268 A | 8/2000 | Jones, Jr. | |
| 6,854,791 B1 * | 2/2005 | Jaggi | B62D 29/041 296/203.01 |
| 7,083,199 B2 | 8/2006 | Graber | |
| 7,211,916 B2 | 5/2007 | Hahn | |
| 7,287,797 B1 | 10/2007 | Belloso | |
| 7,559,385 B1 | 7/2009 | Burt | |
| 7,850,413 B2 | 12/2010 | Fontana | |
| 8,165,718 B2 | 4/2012 | Ota | |
| 8,696,010 B2 * | 4/2014 | Toebes | B65G 13/00 280/400 |
| 8,790,061 B2 | 7/2014 | Yamashita | |
| 9,522,781 B2 | 12/2016 | Hortig | |
| 2004/0095029 A1 | 5/2004 | Ewert | |
| 2005/0125963 A1 | 6/2005 | Lux | |
| 2008/0282494 A1 | 11/2008 | Won | |
| 2009/0074545 A1 * | 3/2009 | Lert, Jr. | B65G 1/0492 414/276 |

FOREIGN PATENT DOCUMENTS

| | | | |
|---|---|---|---|
| EP | 1298039 A1 | 4/2003 | |
| FR | 2831510 A1 * | 5/2003 | ............. B62D 21/10 |
| WO | 2013/013252 A1 | 1/2013 | |

* cited by examiner

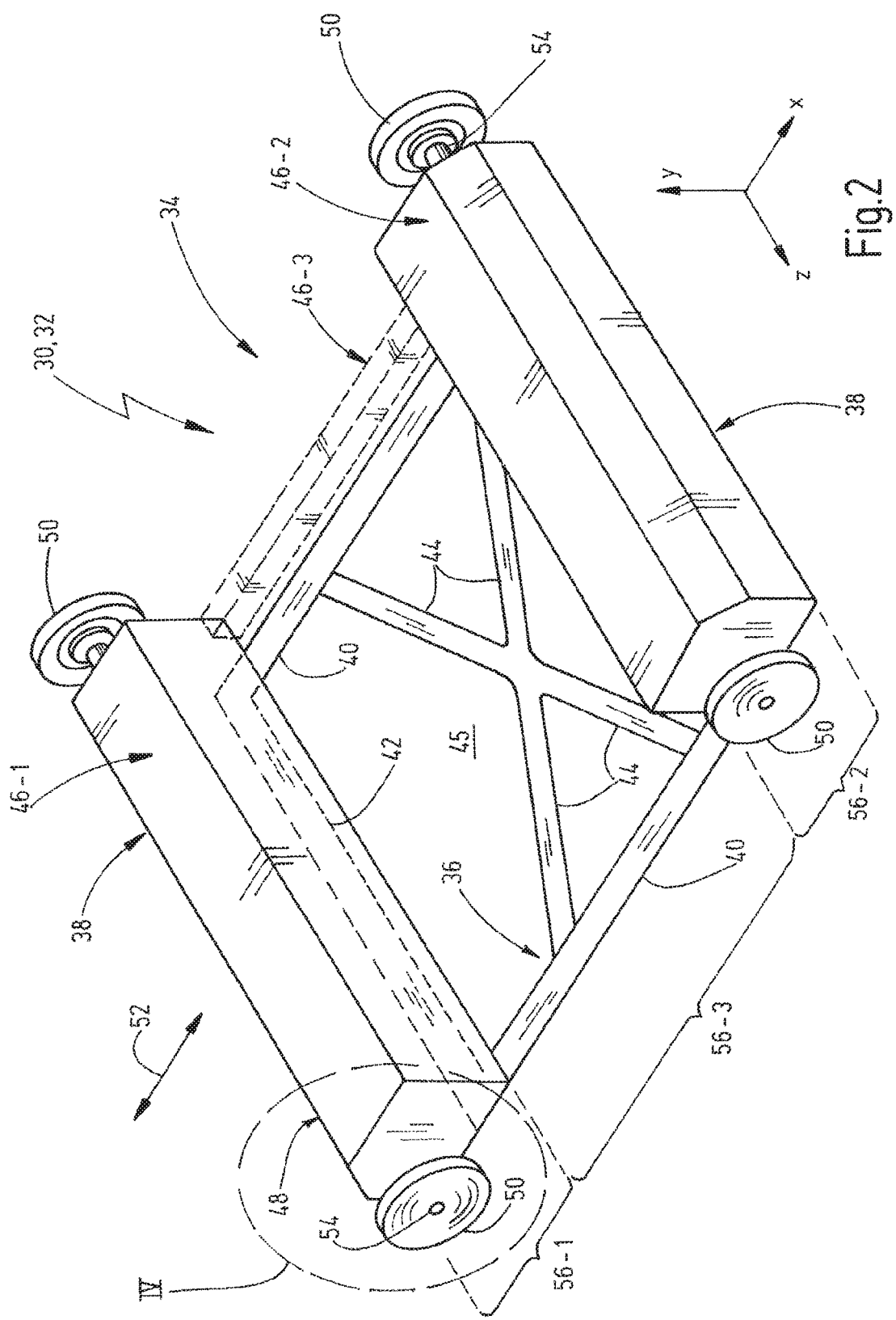

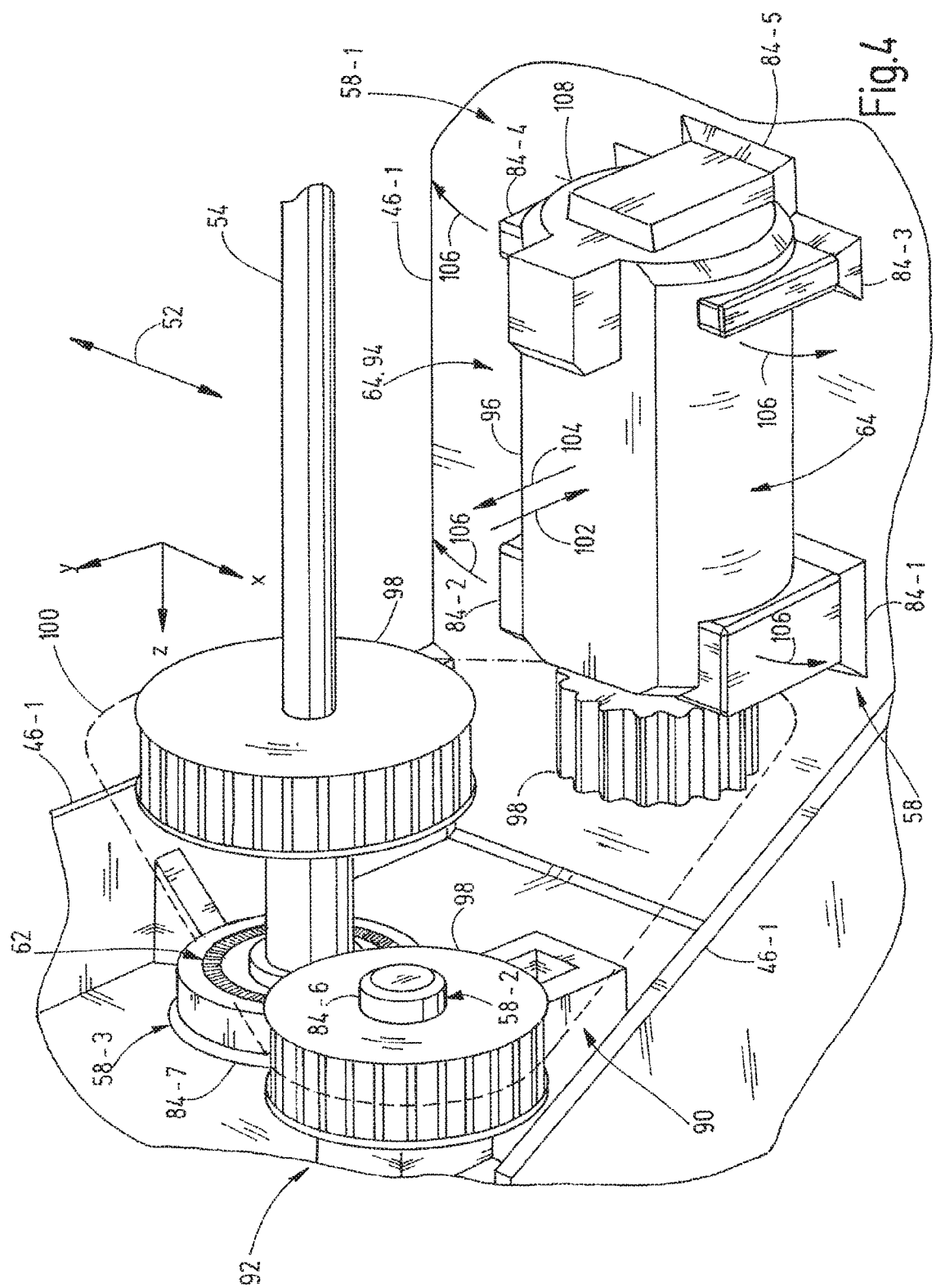

CONVEYING VEHICLE AS WELL AS BASE FRAME AND MODULAR SYSTEM FOR CONVEYING VEHICLE

RELATED APPLICATIONS

This application is a continuation of U.S. application Ser. No. 15/003,192 filed on Jan. 21, 2016, which is a continuation of International Application No. PCT/EP2014/065149 (WO 2015/010959 A1) filed on Jul. 15, 2014, which claims priority to German Application No. DE 10 2013 107 873.7 filed on Jul. 23, 2013, all of which are fully incorporated herein by reference.

BACKGROUND OF THE INVENTION

The present invention relates to a base frame which can be used universally for different modular conveying vehicles, in particular for shuttles. Particularly, the base frame may be made of plastic, preferably by means of injection molding.

Further, the present invention relates to a modular system having a corresponding universal base frame and component-specific adapters. In addition, the present invention relates to a conveying shuttle having a corresponding base frame.

RELATED PRIOR ART

In intralogistics different transportation systems are used for overcoming distances. The transportation systems convey transportation goods from a source to a destination. The transportation systems comprise conveying systems and vehicle systems. In a conveying system the transportation good is conveyed with or without load support in terms of a conveying good on a driven transportation network from a receipt station to a delivery station. In a vehicle system the transportation good is conveyed by an individual drive through a drive-lacking transportation network from a loading station to an unloading station.

One trend in intralogistics is to use conveying goods, and so-called shuttles, for in-house material flow in an increased manner. There are autonomous travelling shuttles which can move along free selectable travelling paths, also outside of a rack, and there are guided shuttles which, for example, can drive within a rack on travelling rails, which are attached to the racks, in a guided manner. Thus, there is a great need for cheap shuttles since more and more shuttles are used within storage and order-picking systems.

The utility model DE 20 2009 016 914 U1 discloses a self-propelled guided shuttle.

The international patent application WO 2013/013252 A1 discloses a self-propelled guided shuttle comprising a base frame. The base frame comprises frame parts. The frame parts are manufactured cheap and simple since they are made of thin sheet metal. The frame parts of the base frame are components formed of thin sheet metal and are cut chiplessly. Alternatively, the parts can be formed from chiplessly converted conversion parts. The frame parts are joined by bonded connection (e.g., welded). The majority of the frame parts are formed chiplessly from very thin sheet metal in terms of simple components, which are mostly planar, and/or from conversion parts formed from thin sheet metal so that low manufacturing costs are achievable. This is particularly advantageous for a simple series production (also in small series). The frame parts, which are made of the thin sheet metal, are cut, for example, by means of laser cutting or punching. The conversion parts can be bended, stamped, or embossed. In this manner, a simple and cheaply mountable modular system can be established. Such thin sheet metal constructions require very low investments in tool devices and in special production devices. Thus, they are ideal for small numbers of pieces and have a high flexibility as well as a huge variety of variations.

A further more complex component integration, and in particular functional integration, does not take place. The frame components are mainly joined manually (e.g., welded and/or screwed). Functional components (e.g., motor and control circuit board) are fixed to the frame component by means of screwed connections. Mounting the functional components relatively requires a lot of time. The usage of injection molding techniques is not profitable for small series.

In the known shuttles each of the supporting functional elements is made of metal covered by plastic parts.

SUMMARY OF THE INVENTION

Therefore, it is an object of the present invention to provide for a conveying vehicle a base frame which is further simplified, integrates more functions, saves material costs, and reduces manufacturing costs, wherein high functional and manufacturing quality is maintained.

Further, it is an object of the present invention to provide a corresponding modular system as well as a corresponding conveying vehicle.

According to a first aspect it is disclosed a base frame which can be used universally for different modular conveying vehicles, in particular for shuttles, wherein the conveying vehicles can travel horizontally along a travelling direction within a storage and order-picking system, wherein the base frame comprises a supporting frame and a structure connected to the frame, wherein at least the structure is made of plastic only, and wherein the structure comprises a plurality of component-specific seatings being formed integrally with the structure and being configured to positively hold in a resilient clamp at least one of the following functional components of the respective conveying vehicle: a bearing; a driving unit; a sensor; an actuator; a load-handling device; a communication unit; a cabling, and an electronic controlling unit; wherein each of the functional components is positively insertable into or onto the respective component-specific seating along a component-specific mounting direction. Preferably each of the functional components can be fixed positively in a component-specific dismantling direction oppositely to the mounting direction by means of the respective component-specific resilient seating.

The structure of the base frame might be a plastic structure allowing complex component integration and functional integration. The structure includes complete (positive) seatings for the functional components, which can form complex component groups. The seatings for such complex component groups are integrated into one single component (namely the structure). Thus, for example, the motor seating supports the motor, fixes the motor in the right position, and serves as torque support at the same time. In a conventional construction several components are required for this purpose, which in turn need to be fixed to the (thin sheet metal) frame, or another auxiliary construction, by means of tools and additional fixing elements (e.g., angle bracket etc.).

The base frame replaces a plurality of individual conventional components and units by plastic elements. Several functions are integrated into one single construction (e.g., gear seating and turn buckle, housing, and bearing seat, etc.).

Material costs are saved since many individual parts (e.g., fixing angle, screws, springs, bearing seatings, etc.) become unnecessary.

The production costs are reduced since many mounting steps become unnecessary. The functional components are inserted simply into the corresponding component-specific seatings without tools and sit there positively and non-positively in a clamp without the risk of getting lost. In this manner high quality is achievable by less working steps, and thereby less error possibilities, as well as by the confusion-safe mounting positions, which are preset by the component-specific seatings, and component tolerances.

In accordance with a preferred embodiment the frame and the structure are formed as one piece with each other.

The integral forming of the frame and the structure simplifies the assembly, i.e. mounting, of the conveying vehicle. There is only one element to which each of the functional components is attached. Only one single injection-molding tool is required. Nevertheless, the base frame resulting therefrom can be used for a plurality of different types of conveying vehicles.

Preferably the structure is injection-molded and/or laminated.

The functional components might be mountable, in particular without tools, i.e. toollessly.

This shortens the mounting time. Due to the component-specific positive fitting, the functional components can only be mounted in the seatings provided for this purpose. This increases the production quality and reduces mounting faults.

In addition, it is advantageous if each of the seatings is implemented by a recess in the structure and/or a nose projecting from the structure.

The recesses and noses may be formed integrally, i.e. in one piece, with the structure. The recesses and noses can be manufactured in one step together with the structure. The recesses and noses are integrated components of the structure. During the mounting of the conveying vehicle, the number of required components is reduced since they are already integrated into the structure.

With another preferred embodiment the component-specific seatings are arranged at locations of the structure which are adapted to each other.

Thereby it is possible to form cooperating components. Costly adjustment works during the mounting of the components are omitted.

Preferably the base frame further comprises a seating for at least one of the following functional groups: running-wheel axle; housing; additional reinforcement ribs; hoisting unit; an energy storage; mast, or mast foot.

The base frame is universally usable for many different types of conveying vehicles. The base frame can be used for one-plane servicing devices. The base frame can be used for multi-plane servicing devices. The base frame can be used for autonomously travelling shuttles. The base frame can be reinforced in preferred directions, e.g., along the travelling direction or transversally thereto, dependent on stress of the conveying vehicle.

In particular the plastic might be a glass-fiber reinforced, or carbon-fiber reinforced, composite having a plastic matrix.

With an advantageous embodiment the frame and the structure respectively might comprise a rectangular circumferential base area which is open at its inside.

This embodiment allows simple receipt of a load-handling device. The load-handling device can act, for example, upwardly and downwardly along the height direction.

Further it is an option that the structure is divided into a plurality of sections, wherein a first section is configured to receive the load-handling device, and wherein one or more second sections are configured to receive the remaining functional components.

The subdivision of the base frame into sections allows a locally accurate reinforcement of the structure. Typically, the load-handling device causes the greatest stresses so that in this region reinforcement of the structure, and the frame, is useful.

Generally it might be useful to reinforce the plastic in the region of the seatings since the highest stresses occur there.

According to a second aspect it is disclosed a modular system having a universal base frame and at least one component-specific adapter, wherein the base frame comprises: a supporting frame; and a structure connected to the frame; wherein at least the structure is made of plastic only, wherein the structure comprises a plurality of component-specific seatings being formed integrally with the structure and being configured to hold positively in a resilient clamp at least one of the following functional components of the respective conveying vehicle: a bearing; a driving unit; a sensor; an actuator; a load-handling device; a communication unit; a cabling; and an electronic controlling unit; wherein each of the functional components is insertable positively into or onto the respective component-specific seating along a component-specific mounting direction, and wherein each of the adapters is geometrically adapted positively to one of the component-specific seatings as well as to the respective functional components.

According to a third aspect it is disclosed a conveying shuttle having a base frame which conveying vehicle further comprises: a plurality of running wheels; running-wheel bearings; a drive unit; at least one sensor; a cabling; and an electric controlling unit; and wherein the base frame comprises: a supporting frame; and a structure connected to the frame; wherein at least the structure is made of plastic only, and wherein the structure comprises a plurality of component-specific seatings being formed integrally with the structure and being configured to hold positively in a resilient clamp at least one of the following functional components of the conveying shuttle: one of the bearings; the driving unit; the at least one sensor; an actuator; a load-handling device; a communication unit; the cabling; and the electronic controlling unit; wherein each of the functional components is insertable positively into or onto the respective component-specific seating along a component-specific mounting direction.

BRIEF DESCRIPTION OF THE DRAWINGS

It is clear that the above-mentioned and hereinafter still to be explained features can be used not only in the respectively given combination but also in other combinations or alone without departing from the scope of the present invention.

Embodiments of the invention are illustrated in the drawings and will be explained in more detail in the following description, wherein:

FIG. 2 shows a perspective view of a simplified-illustrated conveying vehicle;

FIG. 4 shows a perspective partial view of a structure including corresponding functional components;

PREFERRED EMBODIMENTS OF THE INVENTION

The invention is used in the field of intralogistics and relates to material flow within storage and order-picking system 10.

Figure 1:
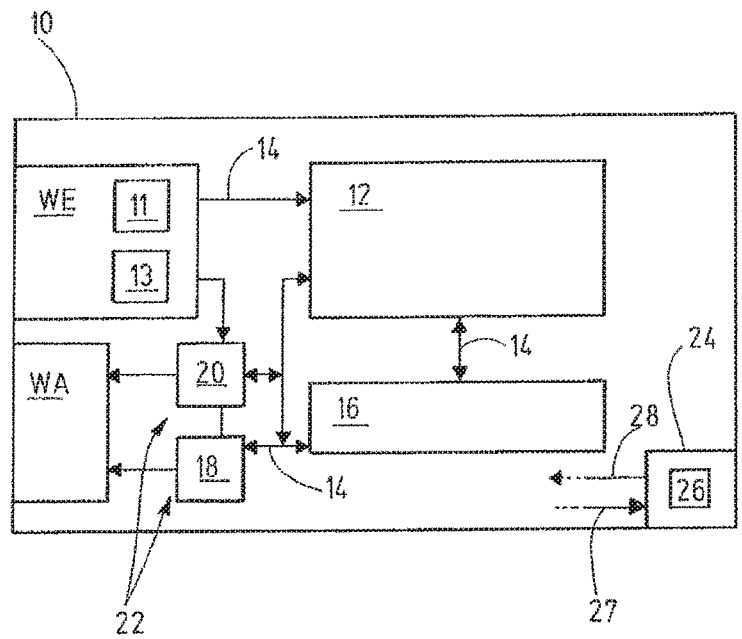
FIG. 1 shows a block diagram of a storage and order-picking system.

The exemplary storage and order-picking system 10 is shown in FIG. 1. The system 10 comprises a goods receipt WE and a goods issue WA as well as a warehouse 12. In the region of the goods receipt WE so-called "teach-in" stations 11 and separation stations 13 can be further provided. A dimension (e.g., height, width, and depth) of a piece good, or case, can be measured at the "teach-in" station 11 for supplying data to an order-picking control, or controlling unit, 24 which data are required during handling of the corresponding piece good (e.g., storing, storage volume, retrieval, package, order-picking, etc.).

As a matter of principle all of the elements of the storage and order-picking system 10, which are involved in material flow, can be connected to each other by bidirectionally operable stationary conveying systems and conveyors 14. Alternatively, and additionally, autonomously movable conveying vehicles 30 can be used, which will be explained in more detail with reference to FIG. 2. The conveyors 14 are indicated by arrows in FIG. 1. The warehouse 12 can be connected to, for example, a sorting device 16 and other working stations 22 such as a picking station 18 or a packing-working station, or packing station 20, via the conveyors 14. The control of the material flow is handled by the controlling unit 24 which comprises a processing unit 26. The controlling unit 24 can be realized in terms of a central host or in terms of computers which are distributed in a decentralized manner. The controlling unit 24 is operated by software taking over the order-picking control. The order-picking control comprises, for example, a warehouse administration, an order administration, order-picking guiding strategies (such as pick-by-voice, pick-by-light, pick-by-vision, or similar), an enterprise resource planning system, and/or the warehouse administration. The warehouse administration in turn can regulate material flow as well as administration of storage locations. The just described functions are mostly implemented in terms of software and/or hardware. These can communicate with each other also through one (or more) communication bus(es). The order administration and order processing takes care that incoming picking orders are distributed for processing to the working stations 22 and corresponding travelling orders are generated and distributed. In this context factors such as capacity utilization, range of piece goods, path optimization, and the like are relevant.

A coordination of the processing of (picking) orders is done by an order-processing system which is usually integrated into the order-picking control 24.

The controlling unit 24 communicates relevant information through fixed lines and/or wirelessly in both directions. Sensor signals 27 are exemplarily shown in FIG. 1 as input signals of the controlling unit 24. Output signals are exemplarily shown in terms of travelling signals 28.

FIG. 2 shows a perspective view of a conveying vehicle 30 which is exemplarily implemented in terms of a (channel) shuttle 32. It is clear that the present invention can be applied to any other type of conveying vehicle. The invention can also be applied, for example, to automated guided transportation systems and shuttles 32, which can travel autonomously within the storage and order-picking systems.

The conveying vehicle 30, and the shuttle 32, comprises a base frame 34 including a frame 36 and a structure 38. The base frame 34 in its entirety represents the support part, i.e. the supporting portion, of the conveying vehicle 30. The functional components 60 such as wheel suspensions, driving elements (gear units and motors), the body, or the housing, etc. are fixed to the base frame 34. The functional components 60 will be explained in more detail with reference to FIG. 3.

The frame 36 can be formed in many different constructions (e.g., ladder frame, grid frame, central tube frame, platform frame, etc.). The frame 36 is usually made of steel. However, alloys (aluminum alloy), plastic, or composites can be used as well.

The (vehicle) structure 38 represents a supporting and mounting construction to which the functional components 60 are fixable. In FIG. 2 the structure 48 is formed by two parts and mounted on the frame 36. In this context one speaks of a separated construction. The structure 38 is made of plastic, preferably by injection molding. It is clear that the frame 36 can be manufactured from, preferably reinforced, plastic as well. The frame 36 and the structure 38 can be integrally made of plastic, i.e. they are built in one piece. This is also called an integral construction.

The structure 38 is made of plastic since the plastic has a lower specific weight, and thus is associated with significant weight savings. The plastic is corrosion-resistant. The plastic allows long-range design freedom in the design. The plastic is shock-insensitive. Re-machining of the structure is not required after the manufacturing process is finished.

It is clear that further composites having a plastic matrix can be used. A composite is a material of two or more bound materials, which material has different material properties than its individual components. The components of the composite can be composites itself. In particle and fiber composites particles or fibers are embedded into the other component of the composite, i.e. the so-called matrix. Glass-fiber reinforced plastics as well as carbon-fiber reinforced plastics can be used. A glass-fiber reinforced plastic is a fiber-plastic bond of plastic and glass fibers. Thermosetting (such as polyester resin or epoxy resin) as well as thermoplastic (such as polyamide) plastic may be used as basis. Glass-fiber reinforced plastic is cheap and can be mechanically stressed highly. Glass-fiber reinforced plastic has a relatively low elastic module and also shows an excellent corrosion behavior in aggressive environments. Carbon-fiber reinforced plastic is a fiber-plastic composite having carbon fibers embedded, mostly in several layers, as reinforcement in a plastic matrix. Usually the matrix consists of duromers such as epoxy resin or of thermoplastic materials.

Returning to FIG. 2 longitudinal struts 40, transversal struts 42, as well as optional cross struts 44 are shown. The struts 40, 42, and 44 form the frame 36, which preferably is closed in itself, and span substantially a base area 45 of the shuttle 32. The longitudinal struts 40 extend in a longitudinal direction X. The transversal struts 42 extend in a transversal direction Z. The longitudinal struts 40 and the transversal struts 42 surround the base area 45 which is exemplarily rectangular here. For increasing rigidity, the cross struts 44 can be arranged between the struts 40 and/or 42.

The structure 38 of FIG. 2 is exemplarily formed in two parts and thus comprises two structure elements 46-1 and 46-2. The structure elements 46-1 and 46-2 are arranged in the region of the transversal struts 42. The structure element 46-1 and 46-2 are connected to the frame 36. The connection can be positive, non-positive (e.g., by screwing), and/or a bonded connection (integral formation of the frame 36 and the structure 38). It is clear that the structure 38 can be formed integrally or in terms of multiple parts. For increasing the rigidity of the structure 38, for example, a further structure element 46-3 can be provided which extends in the longitudinal direction X between the structure elements 46-1 and 46-2, which extend in the example of FIG. 2 substantially in the transversal direction Z. In this case the structure 38 has a U-shaped base. In particular, however, a rectangular base shape is preferred because this is particularly torsion-stiff. A rectangular base shape can be achieved, for example, by arranging the right-hand side structure element 46-3 additionally on the left-hand side as well. In this manner, a circumferentially closed structure 38, which is open at its inside, can be achieved (not illustrated in FIG. 2).

The shuttle 32 of FIG. 2 is provided with a housing 48, which is covering the structure elements 46, in the region of the structure elements 46-1 and 46-2. The housing 48 is optional. Further, running wheels 50 are provided which protrude laterally and are mounted on a respective axle 54. The axle 54 can be formed continuously. Alternatively, single-wheel suspension can be selected. The shuttle 32 can travel by means of the running wheels 50 on running rails, which are not illustrated, for example, within a rack aisle in a selected rack plane (cf., e.g., FIG. 6 of DE 201 12 328 U1).

The base frame 34 can be divided in the longitudinal direction X, in the transversal direction Z, and/or in the height direction Y into several sections 56. In FIG. 2 the base frame 34 is divided in the longitudinal direction X into three sections 56-1 to 56-3. The shuttle 32 can also be moved back and forth in the longitudinal direction X (travelling direction) as indicated by means of an arrow 52. The structure elements 46-1 and 46-2 are arranged in the first and second sections 56-1 and 56-2. The sections 56-1 and 56-2 represent outer end regions of the shuttle 32 in the travelling direction 52. The third central section 56-3 is reserved for the load-handling device 70, which will be explained in more detail with reference to FIG. 3 and which is not depicted in FIG. 2. The load-handling device (LHD) 70 serves, in the present case, for storing/retrieving conveying goods in the transversal direction Z. The structure element 46-1 and 46-2 (and also the structure element 46-3, if necessary) are arranged and formed such that they receive the LHD 70 positively and hold the same non-positively (clamp connection) as will be explained hereinafter in more detail.

Figure 3:
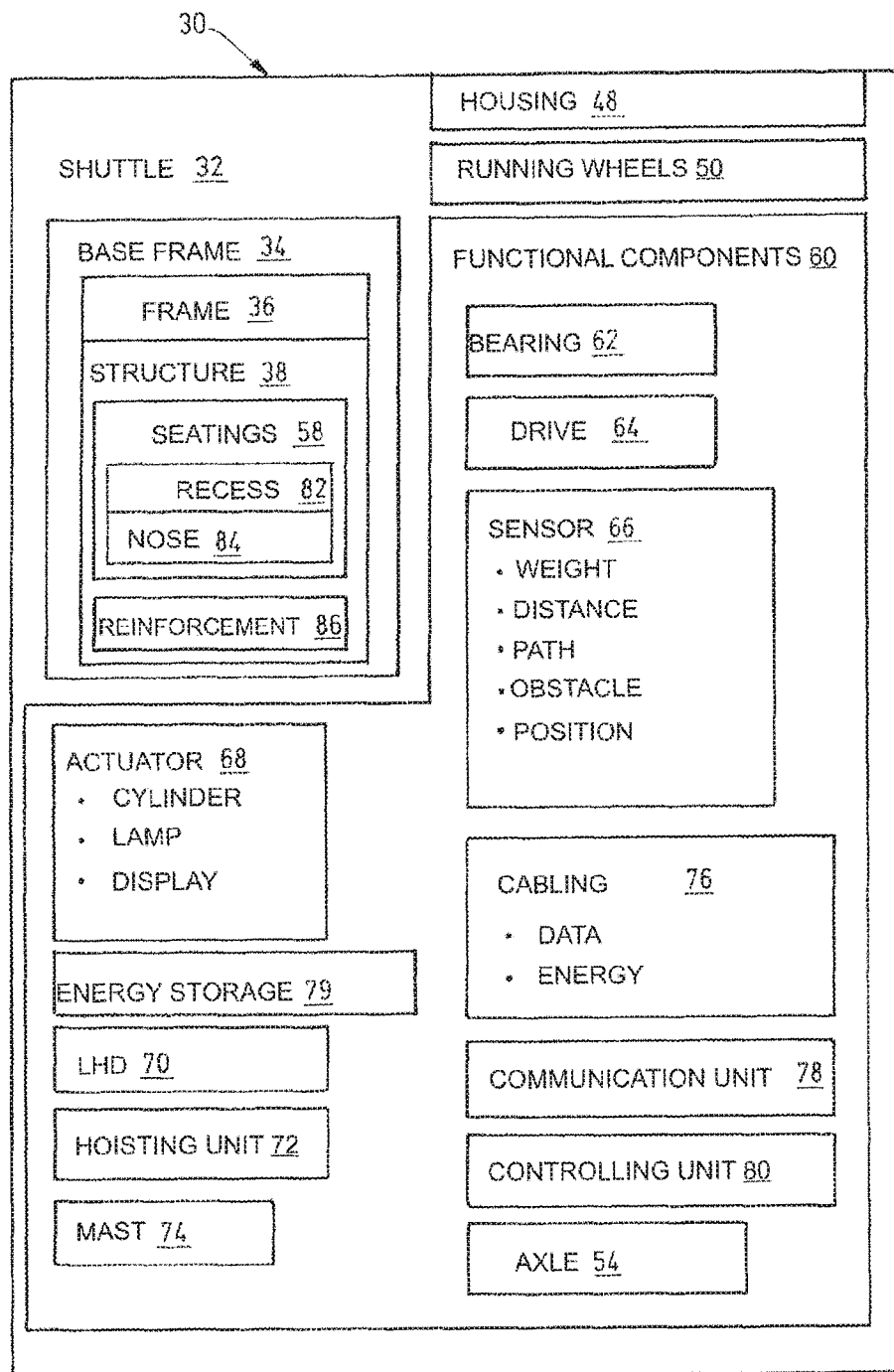
FIG. 3 shows a block diagram of a shuttle.

With reference to FIG. 3, hereinafter a structure of the conveying vehicle 30 will be explained exemplarily with reference to the example of the shuttle 32. FIG. 3 shows a block diagram of the structure of the shuttle 32.

The shuttle 32 comprises the base frame 34, the housing 48, the running wheels 50, as well as one or more of the functional components 60.

The base frame 34 comprises the frame 36 and the structure 38. The structure 38 includes one or more component-specific seatings (such as receptacles or the like) 58. Each of the seatings 58 is configured to hold one of the functional components 60 positively in a clamp. Preferably each of the seatings 58 is formed integrally with the respective structure 38. Each of the seatings 58 is configured to hold one of the functional components 60 by means of a resilient deformability of the structure 38 in a mounting position, wherein dismantling is possible in an oppositely orientated dismantling direction, as will be explained below in more detail.

The functional components 60 comprise at least one of the following elements: a bearing, or a bearing device (e.g., running wheel bearing) 62; a drive, or driving unit 64; at least one sensor 66; at least one actuator 68; a load-handling device (LHD) 70; a hoisting unit 72; a mast 74; a cabling 76; a communication unit 78; an axle 54; an energy storage 79; and/or a controlling unit 80.

For each of the above-mentioned functional components 60 an individual component-specific seating 58, which receives positively the respective component 60 in the mounting direction, is provided in the structure 38. The seatings 58 can be implemented in terms of one or more recesses 82 and/or one or more noses 84. Optionally, the structure 38 can comprise additional reinforcements (e.g., reinforcement ribs) 68 being functionally similar to the cross struts 44 (cf. FIG. 2).

The sensors 66 can determine, for example, a weight, a distance, a path, an obstacle, a position, or the like. The sensors 66 are in data communication with the controlling unit 80.

The actuators 88 can be implemented, for example, in terms of (adjusting) cylinders, lamps, displays, or the like. Also the actuators 88 are in data communication with the controlling unit 80.

The controlling unit 80 is further in data communication via the cabling 76 with the drive 64, the load-handling device 70, the hoisting unit 72, and/or the communication unit 78. The controlling unit 80 can communicate with the controlling unit 24 (cf. FIG. 1) via the communication unit 78.

The running wheels 50 are supported by the axles 54 in the bearings 62 and are driven by the drive 64. The drive 64 gets the energy required for this purpose delivered through the cabling 76 from the energy storage 79 and is regulated by the controlling unit 80.

If the LHD 70 is adjustable in height, the LHD 70 is connected to the hoisting unit 72 which in turn receives instructions thereof from the controlling unit 80. The LHD 70, in this case, can be moved along the mast 74 in the height direction Y.

With reference to FIG. 4, which shows a perspective view of a region of the structure element 46-1, which is surrounded in FIG. 2 by a dashed line designated by "IV", the positive integration of the functional components 60 into the structure 38 is described exemplarily with reference to the drive 64, one of the running-wheel bearings 62, as well as a clamping fixture 90 and a redirecting device 92. FIG. 4 shows the structure element 46-1 of FIG. 2 only partially, wherein the housing 48 is omitted and one observes the interior of the shuttle 32 from obliquely above.

In the lower region of FIG. 4, the drive 64 is shown in terms of an electric motor 94. The electric motor 94 comprises, for example, a cylindrical housing 96 extending in its assembled state substantially along the transversal direction Z. The electric motor 94 is connected to a gear 98 which rotates about a (motor) axle, which is not designated here in detail and oriented in parallel to the transversal direction Z. The gear 68 meshes with a traction device (e.g., sprocket belt) 100 indicated by a dashed line in FIG. 4. The traction device 100 connects the gear 98 of the electric motor 94 to a gear 98 of the redirecting device 92 as well as to a gear 98 sitting rotationally fixed on the axle 54. The traction device 100 rotates endlessly in the plane XY. The clamping fixture 90, which will be explained in more detail later, is responsible that the traction device 100 is always biased in the longitudinal direction thereof and that non-slip drive of the running wheels is ensured, which are not illustrated here.

The electric motor 94 is inserted, or pressed, in a mounting direction 102 (negative direction Y) into the motor-specific seating 58-1 and is retrieved in a dismantling direction 104 (positive direction Y). The mounting direction 102 is orientated oppositely to the dismantling direction 104. Both the mounting direction 102 and the dismantling direction 104 are orientated exemplarily in parallel to the height direction Y in FIG. 4. The mounting and the dismantling are performed without tools, i.e. only manually, since the motor-specific seating 58-1 receives the cylindrical electric motor 94 positively in the assembled state shown in FIG. 4.

The motor-specific seating 58-1 comprises, for example, five noses 84-1 to 84-5. The noses 84-1 and 84-2 as well as the noses 84-3 and 84-4 are arranged in pairs and oppositely to each other in the longitudinal direction Y and engage positively the cylindrical housing 96 of the electric motor 94 in the plane XY. The noses 84-1 and 84-4 take care that the electric motor 94 is held positively in the longitudinal direction X and in the height direction Y. In the height direction Y the noses 84-1 and 84-4 additionally hold positively the electric motor 95 in a clamp and thereby prevent that the electric motor 94 can fall from the seating 58-1 in the longitudinal direction Y. The noses 84-1 to 84-4 are resiliently movable outwardly as indicated by arrows 106. The noses 84-1 to 84-4 substantially extend in parallel to the height direction Y. However, the noses 84-1 to 84-4 are flexibly movable outwardly during the assembly in order to release the electric motor 94 in the height direction Y. Sides of the noses 84-1 to 84-4, which are facing the electric motor 94, are adapted positively, with regard to the contour thereof, to the housing 96 of the electric motor.

The noses 84-1 and 84-2 are further formed so that they hold the electric motor 94 not only in the longitudinal direction X but also in the transversal direction Z. In top view they have an L-shaped cross section. The fifth nose 84-5, which is positioned directly opposite to a front side 108 of the electric motor 94, can be formed rigidly, i.e. have no flexibility, since the nose 84-5 only needs to prevent the electric motor 94 to move in the negative direction Z. The nose 84-5 does not need to be bendable outwardly. The noses 84-1, 84-2, and 84-5, however, prevent the electric motor 94 by means of a positive engagement from moving in the direction Z.

The noses 84-1 to 84-5 are formed integrally with the structure element 46-1 and are positioned such that they receive positively and hold the electric motor 94. It is clear that a certain clearance can be present between the noses 84-1 to 84-5 and the electric motor 94 in each direction since the electric motor 94 is not sitting in a press fit in the seating 58-1.

The other functional components 90, which are exemplarily shown in FIG. 4, namely the redirecting device 92 as well as the (running-) wheel bearing 62 are sitting positively on, or in, the component-specific seatings 58-2 and 58-3 thereof. The seating 58-2 for the gear 98 of the redirecting device 92 can be a pin-like nose 84-6. The seating 58-3 for the bearing 62 can be a sleeve-like circular nose 84-7, which is hollow at the inside, similar to a blind hole which can be fixed additionally by a ring (not shown) provided at a front side, wherein the ring is fixable to the seating 58-3, for example, by screws which are screwed into the body at the front side of the seating 58-3. Both the gear 98 of the redirecting device 92 and the bearing 62 are put on, or in, the component-specific noses 84-6 and 84-7 thereof in the positive direction Z (mounting direction). The noses 84-6 and 84-7 have slightly oversized, or undersized, diameters in the region of the front sides thereof, which are orientated in the negative direction Z. This is achieved in that the material strength of the plastic in this region is selected correspondingly. Due to an elastic deformability thereof, the plastic can give way in the radial direction during the mounting of the gear 98 and the bearing 62, and thus releases the way for mounting the respective functional components 60. As soon as this "resistance" is overcome, the plastic extends again and keeps the respective functional component 60 at the respective predetermined mounting location thereof (cf. FIG. 4). The diameters are sized correspondingly.

The mounting of the electric motor 94, the gear 98, the redirecting device 92, and the bearing 62 is performed without tools, i.e. without additional tools, manually by inserting, pressing open, pressing in, or the like. The functional components 60 are held positively at the dedicated locations thereof. However, the functional components 60 can be dismantled—again without tools—against a spring force of the respective noses 84 which is caused by the elastic deformability of the plastic. This mode of action applies to each of the connections between the functional components 60 of the figures and the respective specific seatings 58 thereof.

The seatings 58 can be positioned relative to the structure 38 so that functional groups (cf., e.g., the three gears 98 in FIG. 4) are correctly positioned to each other for ensuring the functional efficiency.

No additional fixing devices (e.g., screws or the like) are required for the mounting. In this sense it is a plug-in system.

The structure 38 preferably comprises at least one first seating 58 for the drive 64, a second seating 58 for the controlling unit (e.g., control board) 80, as well as another seating 58 for the (running-wheel) bearing 62. This represents the preferred "minimum equipment" of the structure 38 with regard to the seatings 58. Since the structure 38 is preferably manufactured by injection molding, the injection-molding tool needs to be shaped correspondingly. The injection-molding tool, or the mold, therefore contains at least the above-mentioned seatings 58 negatively. Assuming this minimum equipment of the structure 38, arbitrary conveying vehicles 30 can be mass-produced. If one of the conveying vehicles 30 comprises a functional component 60, which deviates from the typically used functional components 60, a corresponding component-specific seating can nevertheless be provided (later) on the structure 38 (e.g., by means of thermal welding). The "standard", or the "minimum equipment", can be varied with regard to the functional components 60 which are always realized with the universal base frame 34. The standard is defined by the manufacturer of the conveying vehicles 30. However, the standard allows the manufacturer of the conveying vehicles 30 to realize the base frame in a cost-efficient manner by one single plastic mold even if the corresponding conveying vehicle 30 is used in a small series only. Whether the base frame 34 is used in a big series or a small series is of no relevance since the base frame 34 already contains the positive seating 58 for such functional components 60 which are always required.

Figure 5:
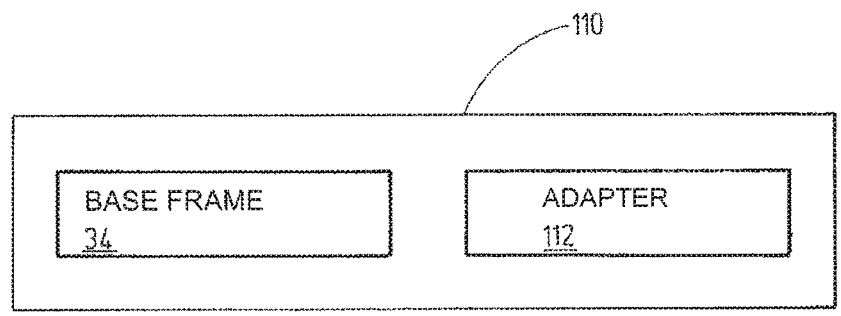
FIG. 5 shows a block diagram of a modular system.

FIG. 5 shows a block diagram of a modular system 110. The modular system 110 consists of the (standardized) base frame 34 as well as at least one component-specific adapter 112. The component-specific adapter 112 can be adjusted positively to both the corresponding component-specific seating 58 and the respective functional component 60. The adapter 112 is always used in cases when a functional component 60 is used which deviates from the originally designed functional component 60. If in FIG. 4, for example, a different electric motor 94 is used, which comprises, for example, a smaller housing 96, this smaller electric motor 94 can no longer sit positively in the seating 58-1. In this case the adapter 112 can be additionally plugged on the housing 96 of the smaller electric motor 94 for fitting positively into the seating 58-1. It is clear that the "standard seating" 58 can therefore be designed for the functional components 60 which preferably are geometrically at maximum. This size-independent configuration allows the manufacturer, or vendor, of the conveying vehicles 30 to use functional components from arbitrary suppliers. Nevertheless, only one single injection-molding tool is required for manufacturing the base frame 34 and the structure 38.

Figure 6:
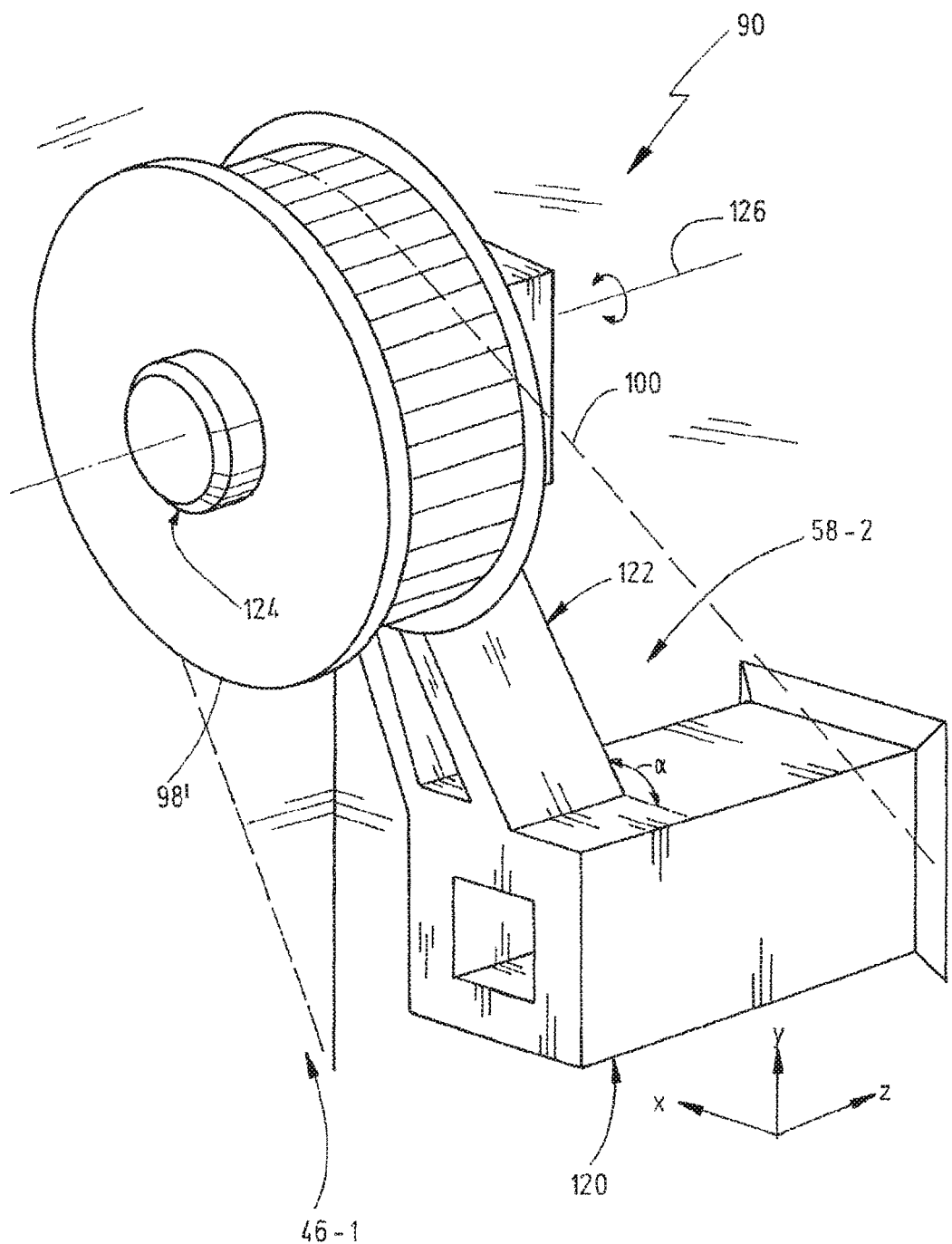
FIG. 6 shows a perspective view of a clamping fixture of FIG. 4.

With reference to FIG. 6, the clamping fixture 90 of FIG. 4 is shown in a different perspective.

FIG. 6 shows the seating 58-2 on which the gear 98 sits, which serves for redirecting and biasing the traction device 100. The seating 58-2 comprises a supporting element 120, an arm 122, and a pin 124. The supporting element 120 extends substantially in the transversal direction Z. The arm 122 substantially extends in the height direction Y. The pin 124 substantially extends in the transversal direction Z and represents rotation axis 126 of the gear 98'. An angle α between the arm 122 and the supporting element 120 is selected such that the gear, or re-directing wheel 98', biases the traction device 100 in the plane XY. Also here the elastic characteristic of the plastic is used so that the fixation and the technical functionality are integrated into the structure 38 and the seating 58-2.

It is clear that the unit consisting of the supporting element 120, the arm 122, and the pin 124 can represent one functional component 60 as such, which can be fixed positively in a dedicated seating 58 (not shown here) in the structure element 46-1.

In the above description of the figures the orientation of the coordinate system has been selected generally as typically used in the field of intralogistics so that the longitudinal direction is designated by X, the height is designated by Y, and the transversal direction is designated by Z.

Further, identical parts and features are provided with identical reference symbols. The disclosure contained in the description can be transferred roughly to similar parts and features having similar reference symbols. Positional and orientation information (e.g., "top", "bottom", "lateral", "longitudinal", "transversal", "horizontally", "vertically", and the like) refer to the immediately described figure. If the position or orientation is changed, this information is to be transferred, however, to the new position and orientation.

REFERENCE NUMERALS 10 storage/order-picking system
11 teach-in station
12 warehouse
13 separating station (depalletizer)
14 conveyor
16 sorting device
18 order-picking station
20 packing station
22 working station
24 controlling unit/order-picking control
26 computer/host
27 input signals
28 output signals
30 conveying vehicle
32 (channel) shuttle
34 base frame
36 frame
38 structure
40 longitudinal strut
42 transversal strut
44 cross strut
45 base area
46 structure element
48 housing
50 running wheel
52 travelling direction
54 axle
56 section
58 seating
60 (functional) component
62 (running-wheel) seating
64 drive (unit)
66 sensor
68 actuator
70 load-handling device (LHD)
72 hosting unit
74 mast
76 cabling
78 communication unit
80 controlling unit
82 recess
84 nose
86 reinforcement/rib
79 energy storage
90 clamping fixture
92 redirecting device
94 electric motor
96 cylindrical housing of 94
98 gear
100 traction device (sprocket belt)
102 mounting direction
104 dismantling direction
106 flexible/elastically movable
108 front side of 94
110 modular system
112 adapter
120 support
122 arm
124 pin/drift
126 rotation axis

What is claimed is:

1. A base frame universally usable for different modular conveying vehicles, wherein each of the conveying vehicles is configured to travel horizontally along a travelling direction within a storage and order-picking system, wherein the base frame comprises:
    a supporting frame;
    a mounting structure connected to the supporting frame; and
    at least one component-specific seating formed integrally and unitary with the mounting structure,
    wherein the at least one component-specific seating includes a plurality of independent nose projections extending outwardly from a surface of the mounting structure, and
    wherein each of the plurality of nose projections is resiliently movable independently of the other nose projections, such that the plurality of independent nose projections are configured to cooperate with each other to form a resilient clamp for positively holding a functional component of the conveying vehicle.

2. The base frame of claim 1, wherein the mounting structure and the plurality of independent nose projections are made of plastic.

3. The base frame of claim 2, wherein the plastic is at least one of: a glass-fiber reinforced composite having a matrix; and a carbon-fiber reinforced composite having a plastic matrix.

4. The base frame of claim 2, wherein the plastic is reinforced in an area of the at least one component specific seating.

5. The base frame of claim 1, wherein the plurality of independent nose projections are configured to cooperate with each other to form the resilient clamp such that the resilient clamp is suitable for positively holding at least one of the following functional components of the conveying vehicle: a driving unit; an actuator; and a load-handling device.

6. The base frame of claim 1, wherein the plurality of independent nose projections are configured to cooperate with each other to form the resilient clamp such that the resilient clamp is suitable for positively holding at least one of the following functional components of the respective conveying vehicle: a bearing; a sensor; a communication unit; a cabling; and an electronic controlling unit.

7. The base frame of claim 1, wherein the at least one component specific seating includes a plurality of component specific seatings that are each integral and unitary with the mounting structure, each of the plurality of component specific seatings being located at a different portion of the mounting structure.

8. The base frame of claim 7, wherein each of the plurality of component specific seatings includes a plurality of independently and resiliently movable nose projections that are configured to cooperate with each other to form a resilient clamp for positively holding a functional component of the conveying vehicle; and
wherein each of the plurality of component specific seatings is configured to hold a different functional component of the conveying vehicle.

9. The base frame of claim 7, wherein the plurality of component-specific seatings are arranged at the different portions of the mounting structure such that they are adapted to each other for forming cooperating component groups.

10. The base frame of claim 1 further comprising a component specific seating for at least one of the following functional components: a running-wheel axle; a housing; additional reinforcement ribs; a hoisting unit; an energy storage; a mast; and a mast foot.

11. The base frame of claim 1, wherein the functional component is fixable positively, in a component-specific dismantling direction oppositely to the mounting direction, by the component-specific seating.

12. The base frame of claim 1, wherein the functional component is toollessly mountable in the at least one component specific seating.

13. The base frame of claim 1, wherein the mounting structure is a first mounting structure connected to a first end portion of the supporting frame, the base frame having a second mounting structure connected to an opposite second end portion of the supporting frame, wherein the first and second mounting structures are non-adjustably spaced apart from each other by a fixed distance.

14. The base frame of claim 1, wherein the supporting frame and the mounting structure are integral and unitary with each other.

15. The base frame of claim 14, wherein the supporting frame and mounting structure is at least one of: injection molded; and laminated.

16. A base frame universally usable for different modular conveying vehicles, wherein each of the conveying vehicles is configured to travel horizontally along a travelling direction within a storage and order-picking system, wherein the base frame comprises:
a supporting frame;
a mounting structure connected to the supporting frame;
wherein the mounting structure comprises at least one component-specific seating, the at least one component-specific seating being formed integrally and unitary with the mounting structure and being configured to hold positively in a resilient clamp at least one functional component of the conveying vehicle;
wherein the mounting structure and the at least one component-specific seating are made of plastic; and
wherein the at least one component-specific seating includes a plurality of component specific seatings that are each integral and unitary with the mounting structure, each of the plurality of component specific seatings having a plurality of independent nose projections extending outwardly from a surface of the mounting structure, in which each of the plurality of nose projections is resiliently movable independently of the other nose projections, such that the plurality of independent nose projections are configured to cooperate with each other to form a resilient clamp for positively holding a functional component of the conveying vehicle, and wherein each of the plurality of component specific seatings are located at a different portion of the mounting structure.

17. The base frame of claim 16, wherein the mounting structure is a first mounting structure connected to a first end portion of the supporting frame, the base frame having a second mounting structure connected to an opposite second end portion of the supporting frame, wherein the first and second mounting structures are non-adjustably spaced apart from each other by a fixed distance.

18. A method of assembling a conveying vehicle configured to travel horizontally along a travelling direction within a storage and order-picking system, the method comprising:
providing a universal base frame comprising:
a supporting frame;
a mounting structure connected to the supporting frame; and
at least one component-specific seating formed integrally and unitary with the mounting structure,
wherein the at least one component-specific seating includes a plurality of independent nose projections extending outwardly from a surface of the mounting structure, and
wherein each of the plurality of nose projections is resiliently movable independently of the other nose projections, such that the plurality of independent nose projections are configured to cooperate with each other to form a resilient clamp for positively holding a functional component of the conveying vehicle;
selecting the functional component for the conveying vehicle; and
assembling the selected functional component onto the conveying vehicle, including positively holding the functional component in the resilient clamp, to thereby provide a corresponding overall functionality of the assembled conveying vehicle.

* * * * *